United States Patent
Beuschel et al.

(10) Patent No.: US 11,644,539 B2
(45) Date of Patent: May 9, 2023

(54) ARRANGEMENT AND METHOD FOR USING LIGHT SIGNALS AND GROUPS OF LIGHT-RECEIVING ELEMENTS WITH DIFFERENT SENSITIVITIES TO DETERMINE A DISTANCE OF AN OBJECT

(71) Applicant: Ibeo Automotive Systems GmbH, Hamburg (DE)

(72) Inventors: Ralf Beuschel, Wangen (DE); Michael Kiehn, Hamburg (DE); Michael Köhler, Hamburg (DE)

(73) Assignee: Microvision, Inc., Redmond, WA (US)

( * ) Notice: Subject to any disclaimer, the term of this patent is extended or adjusted under 35 U.S.C. 154(b) by 240 days.

(21) Appl. No.: 16/954,135

(22) PCT Filed: Nov. 20, 2018

(86) PCT No.: PCT/EP2018/081990
§ 371 (c)(1),
(2) Date: Jun. 15, 2020

(87) PCT Pub. No.: WO2019/115184
PCT Pub. Date: Jun. 20, 2019

(65) Prior Publication Data
US 2021/0165079 A1    Jun. 3, 2021

(30) Foreign Application Priority Data
Dec. 15, 2017   (DE) .......................... 102017222974.8

(51) Int. Cl.
*G01S 7/481*    (2006.01)
*G01S 7/4865*   (2020.01)
(Continued)

(52) U.S. Cl.
CPC .......... *G01S 7/4816* (2013.01); *G01S 7/4863* (2013.01); *G01S 7/4865* (2013.01); *G01S 17/10* (2013.01); *G01S 17/931* (2020.01)

(58) Field of Classification Search
CPC ...... G01S 7/4816; G01S 7/4865; G01S 17/10; G01S 7/4863; G01S 17/931;
(Continued)

(56) References Cited

U.S. PATENT DOCUMENTS 4,322,832 A    3/1982  Sartorius
9,784,835 B1   10/2017 Droz
(Continued)

FOREIGN PATENT DOCUMENTS

DE    2923963    11/1980
DE    10130763   1/2003
(Continued)

OTHER PUBLICATIONS

English Translation of the International Search Report for PCT/EP2018/081992 issued by the European Patent Office dated Feb. 14, 2019.
(Continued)

*Primary Examiner* — Jennifer D Bennett
*Assistant Examiner* — Erin R Garber

(57) ABSTRACT

Light signals are converted into first electric signals by a first group of light-receiving elements, and the light signals are additionally converted into second electrical signals by a second group of light-receiving elements. The second group has a lower degree of sensitivity for converting the photons into an electric current than the first group. The first electric signals are used to ascertain the distance to an object by means of a time-correlated photon counting process depending on a starting time for the emission of the light signals. Furthermore, the second electric signals are used to deter-
(Continued)

mine the distance depending on the starting time but using a second signal processing different from the process used for the first electric signals.

9 Claims, 3 Drawing Sheets

(51) Int. Cl.
*G01S 17/10* (2020.01)
*G01S 7/4863* (2020.01)
*G01S 17/931* (2020.01)

(58) Field of Classification Search
CPC ...... G01S 7/4817; G01S 7/4808; G01S 17/04; G01S 7/486; G01S 17/08; G01S 7/4914; H01L 31/107; H01L 27/14643; H01L 31/02027; G01J 2001/442; G01J 2001/4466; H04N 5/378
See application file for complete search history.

(56) References Cited

U.S. PATENT DOCUMENTS

| | | | |
|---|---|---|---|
| 2004/0233942 | A1 | 11/2004 | Schlueter |
| 2007/0121095 | A1 | 5/2007 | Lewis |
| 2007/0182949 | A1 | 8/2007 | Niclass |
| 2009/0009747 | A1 | 1/2009 | Wolf |
| 2012/0205522 | A1* | 8/2012 | Richardson ............ H04N 5/355 250/214.1 |
| 2015/0028190 | A1* | 1/2015 | Shin ..................... H03K 23/667 341/156 |
| 2015/0124137 | A1* | 5/2015 | Sato ...................... H04N 5/378 341/122 |
| 2015/0285625 | A1 | 10/2015 | Deane |
| 2016/0209498 | A1 | 7/2016 | Kanter |
| 2016/0266253 | A1 | 9/2016 | Kubota |
| 2016/0284743 | A1 | 9/2016 | Mellot |
| 2017/0176575 | A1 | 6/2017 | Smits |
| 2017/0184704 | A1 | 6/2017 | Yang |
| 2017/0187721 | A1 | 6/2017 | Raynor |
| 2018/0113200 | A1* | 4/2018 | Steinberg ................ G01S 17/42 |
| 2018/0324416 | A1* | 11/2018 | Kim ...................... H04N 5/378 |
| 2021/0109196 | A1 | 4/2021 | Beuschel |
| 2021/0116545 | A1 | 4/2021 | Hakspiel |
| 2021/0156975 | A1 | 5/2021 | Beuschel |

FOREIGN PATENT DOCUMENTS

| | | |
|---|---|---|
| DE | 102006013290 | 9/2007 |
| DE | 102008005129 | 5/2009 |
| DE | 102009029372 | 3/2011 |
| DE | 102011005740 | 9/2012 |
| DE | 102014207599 | 10/2015 |
| DE | 102015106635 | 11/2016 |
| DE | 102017121346 | 3/2018 |
| DE | 102017222974 | 6/2019 |
| DE | 102017222972 | 7/2019 |
| JP | 2595354 | 4/1997 |
| JP | 2004157044 | 6/2004 |
| JP | 2011095027 | 5/2011 |
| JP | 2012242218 | 12/2012 |
| JP | 2017003391 | 1/2017 |
| JP | 2018025449 | 2/2018 |
| KR | 1020160142839 | 12/2016 |
| WO | 2017081294 | 5/2017 |
| WO | 2018172115 | 9/2018 |
| WO | 2019115184 | 6/2019 |
| WO | 2019115185 | 6/2019 |

OTHER PUBLICATIONS

Beuschel; U.S. Appl. No. 16/954,170, filed Jun. 15, 2020.
Office Action issued in Japanese Patent Application No. JPO 2020-552106 mailed from the Japan Patent Office dated Nov. 24, 2021.
English Translation of the International Search Report for PCT/EP2018/081990 issued by the European Patent Office dated Feb. 11, 2019.
Beuschel; U.S. Appl. No. 17/046,629, filed Oct. 9, 2020.
English Translation of International Search Report for International Application No. PCT/EP2019/058394 mailed by the European Patent Office dated Jul. 1, 2019.
English Translation of the International Search Report for PCT/EP2019/058392 mailed by the European Patent Office dated Jul. 4, 2019; 2 pages.
Hakspiel; U.S. Appl. No. 17/042,821, filed Sep. 28, 2020.
Office Action issued in Israel Patent Application No. 277855 mailed from the Israel Patent Office dated Nov. 15, 2022.
Office Action issued in Japanese Patent Application No. JPO 2020-555232 mailed from the Japan Patent Office dated Nov. 24, 2021.
USPTO; Notice of Allowance issued in U.S. Appl. No. 16/954,170 dated Dec. 1, 2022.
USPTO; Non-Final Office Action issued in U.S. Appl. No. 16/954,170 dated Jul. 15, 2022.

* cited by examiner

ARRANGEMENT AND METHOD FOR USING LIGHT SIGNALS AND GROUPS OF LIGHT-RECEIVING ELEMENTS WITH DIFFERENT SENSITIVITIES TO DETERMINE A DISTANCE OF AN OBJECT

CROSS-REFERENCE TO RELATED APPLICATIONS

This patent application is the national phase of PCT Application No. PCT/EP2018/081990, filed Nov. 20, 2018, which claims the benefit of German Patent Application No. 10 2017 222 974.8, filed Dec. 15, 2017, both of which are incorporated in their entirety herein by reference.

BACKGROUND OF THE INVENTION

1. Field of the Invention

The invention is based on an arrangement and a method for determining a distance from at least one object using light signals according to the category of the independent claims.

2. Discussion of the Related Art

A system and a method for measuring the phase of a modulated optical signal are known from US 2004/0233942 A1. In this case, so-called single-photon detectors SPDs are used for reception. Furthermore, it is stated that these types of detectors, to which the SPADs (single-photon avalanche diodes) belong, have a so-called dead time.

SUMMARY OF THE INVENTION

The arrangement according to the invention and the method according to the invention for determining a distance of at least one object using light signals having the features of the independent claims have the advantage, in contrast, in that by using different groups of light-receiving elements, wherein the first group has a higher sensitivity for the conversion of the light signals into electrical signals than the second group of light-receiving elements, the close range can be detected particularly well. Monitoring the close range is particularly important for several reasons: The transfer function of the front panel should be monitored for the self-diagnosis of the LiDAR sensor. Objects in front of the LiDAR system must be detectable at a distance of a few centimeters, that is, objects that are approaching should not disappear in this close range. Safety regulations for lasers may require that the emitted light output be reduced when a person or an object is very close to the LiDAR sensor.

It is also problematic that a reflected light pulse on a common front panel in front of the transmitting and receiving device can trigger the light-receiving elements, which are configured, for example, as SPAD cells. After such triggering, the SPAD cells have a so-called dead time. This can be approximately 10 to 20 nanoseconds, after which a renewed detection of light signals is again possible. Also, if the light signals are being sent, the pulse width then being, for example, 5 nanoseconds, no measurement is possible. A front panel can provide direct optical feedback between the transmitter and receiver. If the system is designed for a long range of 200 m, for example, light signals having high energy and very sensitive receiving elements must be used. A small backscattering of the front panel of, for example, 1% is therefore sufficient to completely dazzle the receiver. Typical SPAD receiver cells result in a dead time of 10 to 20 nanoseconds, which corresponds to a close range of 1.5 to 3 meters, in which no object can be recognized. In addition to the lidar system, the invention can also be used for related systems.

In particular, the arrangement according to the invention and the method according to the invention enable a dead time, which, for example, the light-receiving elements of the first group have, can be compensated for by providing suitable light-receiving elements for the second group. That is, the dead time then no longer plays a role at close range. Overall, an arrangement and a method for determining a distance of at least one object using light signals are proposed which have no blindness in the important close range.

The arrangement for determining a distance of at least one object using light signals is a compact arrangement which is surrounded, for example, by a housing, in that either there is only one receiving part for the light signals or a combination having a transmitting part for the light signals. Alternatively, it is possible for the components of the arrangement to be distributed and not to be combined locally.

The distance between the object and the arrangement is the connection through a stretch between these two things. The object is a spatial form that reflects light signals. It can be, for example, a vehicle, a pedestrian, a bicycle, a stone or other objects. The light signals are usually laser signals, but other light signals that have not been emitted by a laser are also possible.

The first group of light-receiving elements, which convert the light signals into first electrical signals, are, for example, so-called single-photon avalanche diodes (SPADs). These SPADs are provided with a high reverse voltage, so that just one photon is sufficient to trigger the avalanche effect in these diodes. The avalanche breakdown must be stopped by an active or passive quench circuit to prevent the component from being destroyed. Stopping the avalanche breakdown and restoring the readiness for reception of a SPAD diode requires approx. 10 to 20 ns. No further detection is possible during this time.

In LiDAR applications, various such diodes may be combined to form macro diodes, for example by ORing the output signals with one another or adding them up. For example, silicon photomultipliers (SiPMs) use a simple analog summation of the output signals of a plurality of SPAD diodes. Such single-photon avalanche diodes are usually made of silicon. However, compound semiconductors are also possible. The operating mode of such diodes is also called the Geiger mode.

The second group is, for example, photodiodes or avalanche photodiodes (APD), which convert the light signals into second electrical signals.

The signal processing can be software functions and/or hardware functions. If there are hardware modules, these can be combined into one hardware module or divided between different hardware modules.

The first signal processing, on the basis of the first electrical signals, determines the distance by means of a time-correlated photon count as a function of a start signal for the emission of the light signals. In the present case, the object detection can be carried out, for example, using the TCSPC (time-correlated single-photon counting) measuring principle. This measurement method is a technique for measuring rapidly changing light intensities. In this case, a measurement is repeated many times and the individual time-correlated photons in relation to the excitation pulse are sorted into a so-called TCSPC histogram according to their measured time. This typically has a temporal channel resolution or class width of 0.1 to 1 ns and represents the temporal course of the light backscattered by a laser pulse. This enables a very precise time measurement of the backscattered laser pulse. For example, an object is hit with many photons by a transmitting device, the photons then being received by the receiver arrangement. By repeating this photon determination frequently, it is possible to precisely determine the light pulse with respect to its time of flight and amplitude. After the measurement has been completed, the times of the local maximum values are determined in the histogram. The temporal position of the maximum values enables distance determination to one or more objects.

The start signal is, for example, a signal of a pulse generator that drives a laser driver. A synchronization of the signal processing of the received light signals with the emitted light signal is thus achieved. This simplifies signal processing. The start signal for the emission of the light signals is output by a transmitter circuit. It is read into the signal processing via an interface. The emission of the light signals means the emitted light from the transmitter circuit. Alternatively, it is possible to feed a part of the emitted light to the receiver circuit. There, this part is then converted into an electrical signal.

The light-receiving elements of the first group have a higher sensitivity for the conversion of the light signals into electrical signals than the light-receiving elements of the second group. In this case, for example, SPADs or SiPMs can be used for the first group and photodiodes or avalanche photodiodes for the second group.

The sensitivity of the light-receiving elements for the reception of light signals is to be understood as the relationship between the incident light and the electrical output signal. With analog photodetectors such as APDs, a low sensitivity means that more light is required to produce the same photo current than with such light-receiving elements having higher sensitivity. With SPAD photodetectors, photocells having low sensitivity have a lower probability of detecting a photon than receiver cells having high sensitivity.

The second signal processing is different from the time-correlated photon count. While the first electrical signals of the SPAD diodes, for example, can be processed directly digitally, the second electrical signals are preferably analog signals that have to be digitized at a very high sampling rate. A conventional analog-digital conversion having a high sampling rate causes high costs and requires a lot of energy. It is particularly advantageous to use an inexpensive sequential analog-digital conversion in combination with the time-correlated photon count.

The same applies to the method according to the invention.

Advantageous improvements to the arrangement and method for determining a distance of at least one object using light signals, as specified in the independent patent claims, are possible through measures and further embodiments listed in the dependent claims.

The second signal processing, on the basis of the second electrical signals, determines the distance to the object by means of a time-correlated sequential sampling as a function of the start signal. Time-correlated sequential sampling is a versatile method for digitizing periodically recurring electrical signals. In the present lidar application, a sampling rate between 1 GHz and 10 GHz is to be achieved for an analog photodetector signal. This is only possible with high costs and high energy consumption with known analog-to-digital converters.

Time-correlated sequential sampling takes advantage of the property that periodically recurring signals can be digitized over several signal periods. In this case, an analog input signal is sampled over several signal periods, the parameters for the sampling being varied in a targeted manner. The sampling is therefore carried out sequentially over several signal periods. The results of the individual measurements are then related to the period of the input signal, that is, correlated in time. The sampled signal is then of higher temporal resolution or quality.

The specific application uses the property of the TCSPC distance measuring method in which a laser pulse is repeatedly emitted with a known signal period. The light backscattered from an object can be evaluated on the one hand, for example, with SPAD photodetectors, wherein the individual photon events are entered in a time-synchronized histogram. Analog receiving elements arranged in parallel can also receive the light signal. Since the light pulse is emitted many times, the sampling can take place sequentially over several periods of the pulse emission. Since the period of the pulse transmission is known, it is easy to bring the measured values of the sequential sampling into the correct temporal relationship.

In this case, it is advantageous that the time-correlated sequential sampling for the second electrical signals compares the preferably analog values with at least one ramp signal and feeds an output signal to a first and inverted to a second time-to-digital conversion, wherein the first and the second time-to-digital conversion can be started by the start signal and connected on the output side with a histogram. The histogram is filled with the second histogram values. The ramp signal is an ascending voltage signal equal to a sawtooth signal.

A supporting measurement method for object detection is a so-called TDC (time-to-digital conversion). This is a device to identify conditions and provide a digital representation of the time that has occurred between two events. For example, a TDC can output the arrival time for each incoming pulse. In particular, the time interval between two pulses is determined with a TDC. In this case, the measurement can be started and stopped when a rising or falling edge of a signal pulse exceeds a corresponding threshold value. Time-to-digital conversion is a method for determining a time, for example, between two pulses, and converting it into a digital word. For example, a counter can be used for this purpose, the counter being activated by a start and a stop signal, for example, of the received light pulse or of the emitted light pulse. So-called interpolation is used to determine the error at the beginning and end of the counter reading determined by the counter. A delay circuit can be used for this. However, it is also possible to use two mutually detuned oscillators or to use a so-called oversampling, for example, a quadruple oversampling, and thus to sample the signal. The time and thus the time of flight can be measured precisely through the counter reading and the values obtained from the interpolation at the start of the count and at the end of the count.

Furthermore, it is advantageous that the first group has single-photon avalanche diodes as the light-receiving elements and the second group has photodiodes or avalanche photodiodes as light-receiving elements.

Photodiodes convert received light into electrical current. An avalanche effect is added to the so-called avalanche photodiodes. These photodiodes are thus more sensitive than conventional photodiodes.

It is also advantageous that the photodiodes or the avalanche photodiodes are arranged on the edge of a semiconductor module on which the single-photon avalanche diodes are located. Alternatively, it is possible for the photodiodes or avalanche photodiodes to be arranged between the single-photon avalanche diodes, preferably separated in columns or rows. In this case, the first and second light-receiving elements have a common receiving lens.

Furthermore, it is possible to place the photodiodes or avalanche photodiodes next to the semiconductor module. In this case, the light-receiving elements of the first and the second group each have an associated receiving lens. The lens can thus be adapted to these respective light-receiving elements.

Furthermore, it is advantageous that at least one ramp counter is provided for generating the at least one ramp signal, which counter is increased in its count value with each start signal up to a predetermined final value, wherein the count value is output to at least one digital-to-analog converter which is connected on the output side to the comparator.

Furthermore, it is advantageous that the reciprocal of a rise time of the at least one ramp signal is an integer multiple of the frequency of the pulses of the time-correlated photon measurement. This has proven to be an advantageous ratio.

BRIEF DESCRIPTION OF THE DRAWINGS

Embodiments of the invention are illustrated in the drawing and are explained in more detail in the following description.

Here shows FIG. 1 a vehicle having LiDAR modules.

DETAILED DESCRIPTION

Figure 1:
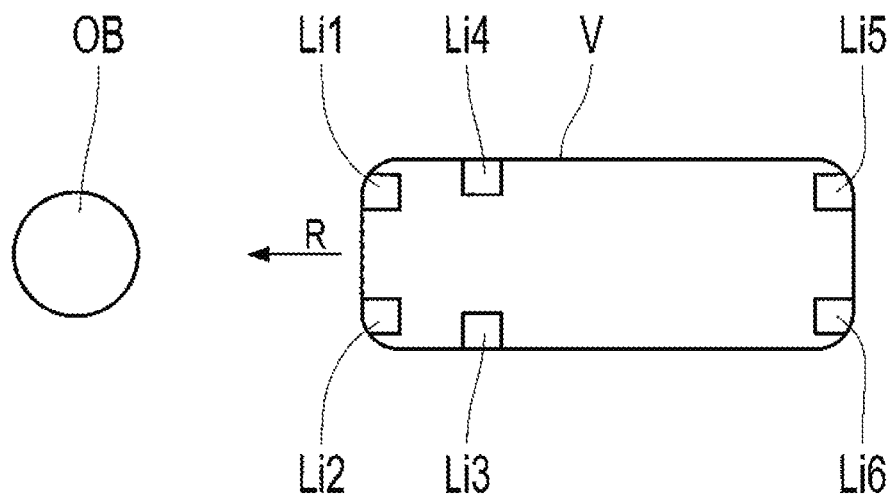

FIG. 1 shows a vehicle V moving in the direction R. The vehicle V has the LiDAR modules Li1 to Li6. A LiDAR module is a transmitting device for sending light signals and the receiving arrangement according to the invention for receiving the then reflected light signals. These LiDAR modules detect the surroundings of the vehicle V. More or fewer LiDAR modules can be used and also at other locations at the vehicle V. The object OB is therefore detected by the LiDAR module Li1. It is possible to infer a possible collision and to influence corresponding movements of the vehicle V in order not to collide with the object OB by determining the distance and correspondingly characterizing on the basis of the movement parameters of the object.

The LiDAR modules Li1 to Li6 have a receiver arrangement according to the invention and a transmitting device which, as described above, sends the laser pulses using a laser array in order to then receive the laser pulses reflected on the object OB using a SPAD array and then evaluate them accordingly using the time-correlated photon count to determine the distance between the object OB and the vehicle V. The time-of-flight method is used for this.

Figure 2:
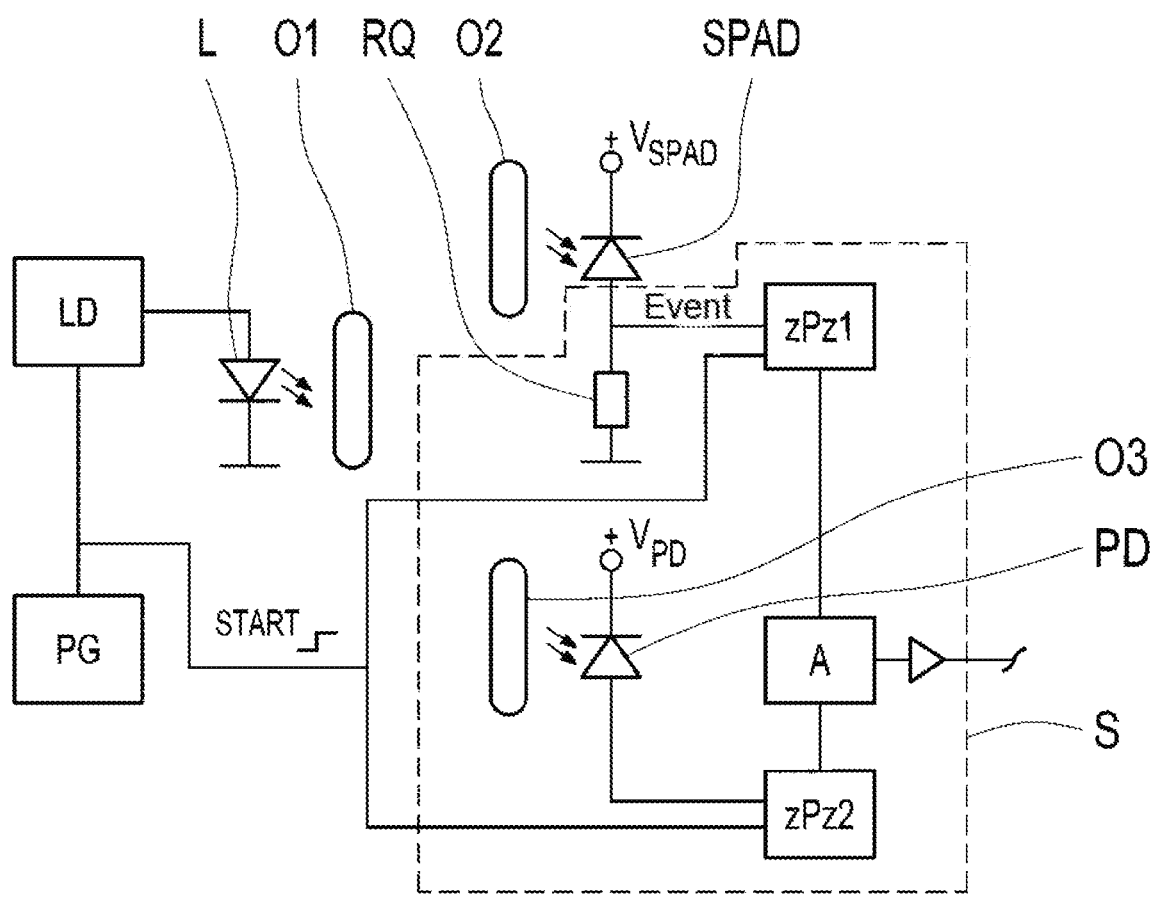
FIG. 2 a first block diagram of the arrangement according to the invention.

FIG. 2 shows a first block diagram of the arrangement according to the invention. A transmitting device is also shown on the block diagram. The transmitting device has a pulse generator PG which supplies a laser driver LD with pulse signals. Depending on these signals, the laser driver drives the laser L, which emits light that is correspondingly emitted into the surroundings by the lens O1. The start signal, which also goes to the laser driver, is also transmitted from the pulse generator PG to the signal processing S of the arrangement according to the invention. The start signal in this case is fed to a time-correlated photon count zPz1 and a time-correlated sequential sample zPz2. The evaluation of the received light signals is thus synchronized with the emission of the light signals from the transmitter circuit. The arrangement according to the invention is symbolized here, for example, by only one representative of the first and second group of light-receiving elements. Both light-receiving elements have their own associated lenses. It is possible to use only one lens. The lenses are labeled O2 and O3, the lens of the laser is labeled O1. The lens O3 directs the light onto the second group of light-receiving elements.

The lens O2 directs the light onto a single-photon avalanche diode SPAD, which uses an avalanche effect to convert even single photons into electrical current. The first and second group of light-receiving elements thus use the same light source L for distance measurement (distance).

If this diode receives corresponding photons, an event is created which is fed to the time-correlated photon count zPz1. Depending on the temporal positioning of this event, a corresponding time is entered in a histogram. This is very often repeated either within a pulse group or within a single pulse.

It is similar with the second group of light-receiving elements, which are symbolized here by the photodiode PD. The photodiode is also under a bias voltage VPD. Alternatively, an avalanche photodiode can be used. After a time-dependent threshold value determination, this photocurrent is fed to a time-correlated sequential sampling zPz2 and likewise entered in a histogram as a corresponding time. An evaluation A determines the distance of the arrangement to the object OB as a function of these histogram values and thus ultimately also of the start signal. This value is output. It is possible for the evaluation A to be located in another control device and that in the present case, histogram values are transmitted directly or also only an intermediate value.

Figure 3:
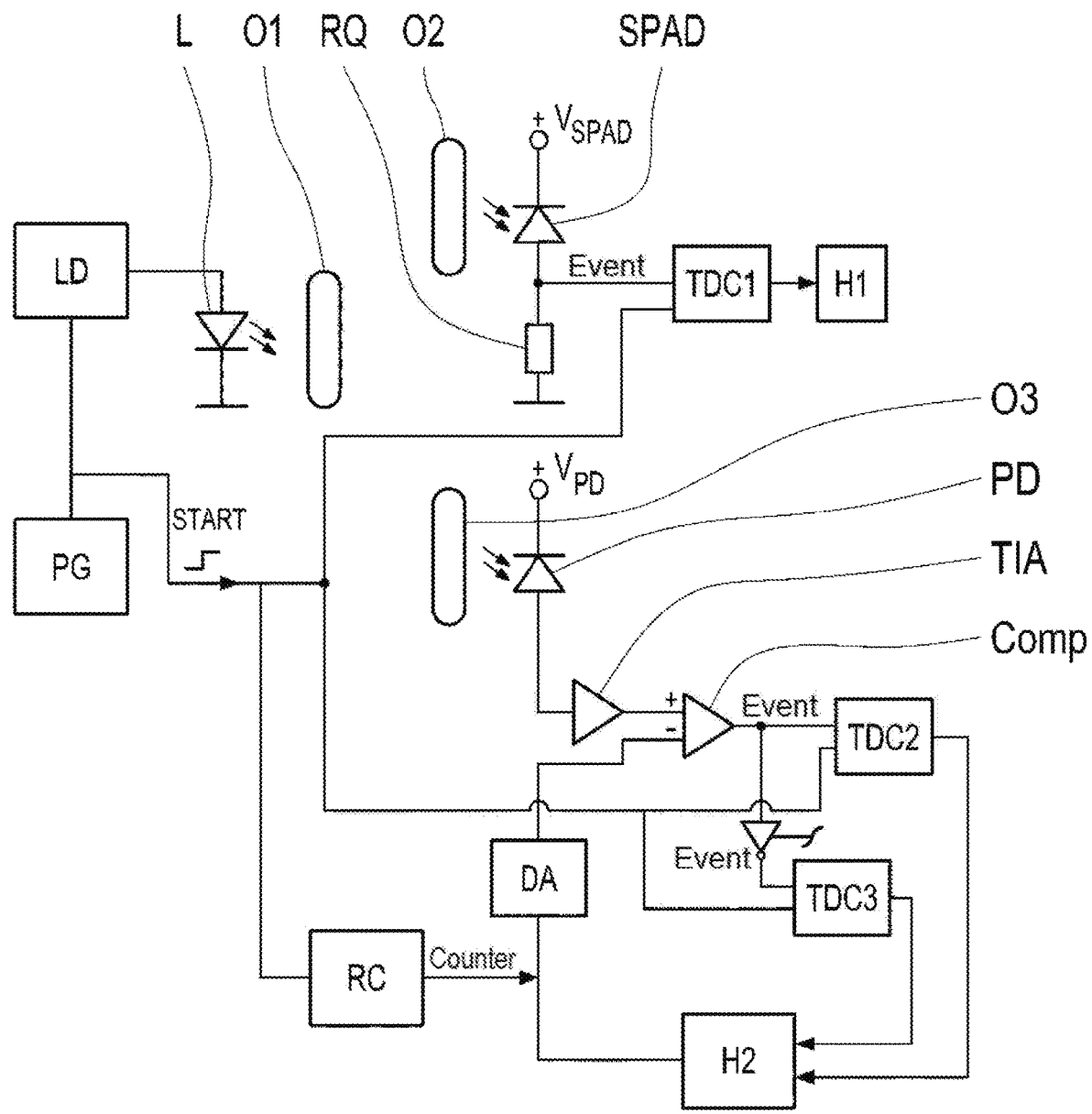
FIG. 3 a second block diagram of the arrangement according to the invention.

FIG. 3 shows the arrangement according to the invention in turn in combination with a transmitter circuit in a second block diagram. The same reference symbols mean the same elements. In turn, the start signal is transmitted from the pulse generator PG to the signal evaluations of the arrangement according to the invention. The time-correlated photon counting with time-to-digital conversion TDC1 and the time-correlated sequential sampling with TDC2 and TDC3 are now carried out here. The event signal from the single-photon avalanche diode SPAD is transmitted as an event to the first time-to-digital conversion TDC1. The corresponding time is entered in the histogram H1 for each event.

The output signal of the photodiode PD is given via a transimpedance amplifier TIA to a comparator Comp and thereby to the positive input. A ramp signal, which was generated from a counter and a digital-to-analog converter, is sent to the negative input. Depending on the difference, the comparator outputs an output signal which is output to a second time-to-digital conversion TDC2 as an event. This event is output inverted to a third time-to-digital conversion TDC3. The output signals of the two time-to-digital conversions TDC2 and TDC3 are entered in a second histogram H2. The histogram H2 also includes the counter signal of the ramp counter RC. The ramp counter RC is also triggered by the start signal Start.

The time-to-digital conversions measure the time of the so-called events in relation to the start signal. Ultimately, the photodiode or the avalanche photodiode are arranged in the optical reception path parallel to the SPAD reception elements. The photocurrent is converted into a voltage by the transimpedance amplifier TIA. The rise time of the sawtooth signal, which is generated by the ramp counter RC and the digital-to-analog converter, is a multiple of the pulse generator frequency, as shown above. There are alternatives to this. Each time a pulse generator is started, the counter is increased by one. The binary value is transferred to the digital-to-analog converter, which converts this into an analog ramp signal. When the ramp counter reaches a defined value, it is stopped and the measurement result can be evaluated. The output signal of the comparator is connected to the two time-to-digital conversions 2 and 3 as illustrated above. The first time-to-digital converter TDC2 measures the times when the output signal of the photodetector exceeds the value of the ramp signal. The second time-to-digital converter TDC3 receives the inverted comparator signal and measures the times when the photodetector signal drops below the value of the ramp signal. The ramp signal generator also outputs a digital counter value that corresponds to the ramp threshold value. The time intervals in which the photodetector signal lies above the value of the ramp signal are recorded in the histogram. All histogram values are initialized with the value zero at the beginning of the measuring cycle. Whenever the photodetector signal exceeds the ramp signal, the corresponding bins are filled with the current counter value of the ramp counter. Smaller values are overwritten with larger ones in subsequent measuring cycles when the photodetector signal is above the ramp signal. When the ramp counter reaches the maximum value, the ramp generator must be stopped. The data in the histogram is ready for an evaluation and a new measuring cycle can be started by resetting the counter.

The evaluation of the two histograms is not illustrated explicitly in FIG. 3, but it can also be present as in FIG. 2.

Figure 4:
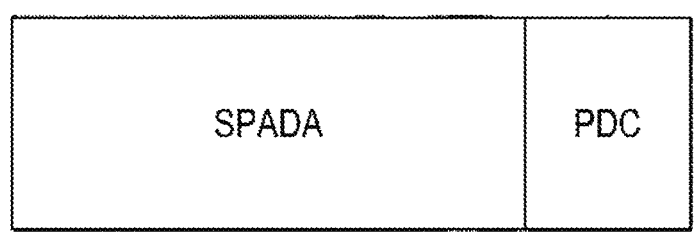
FIG. 4 the surface of a semiconductor module with light-receiving elements of the first and second groups, FIG. 5 a further surface of a semiconductor module with light-receiving elements of the first and second groups and FIG. 6 a flow diagram of the method according to the invention.
Figure 5:
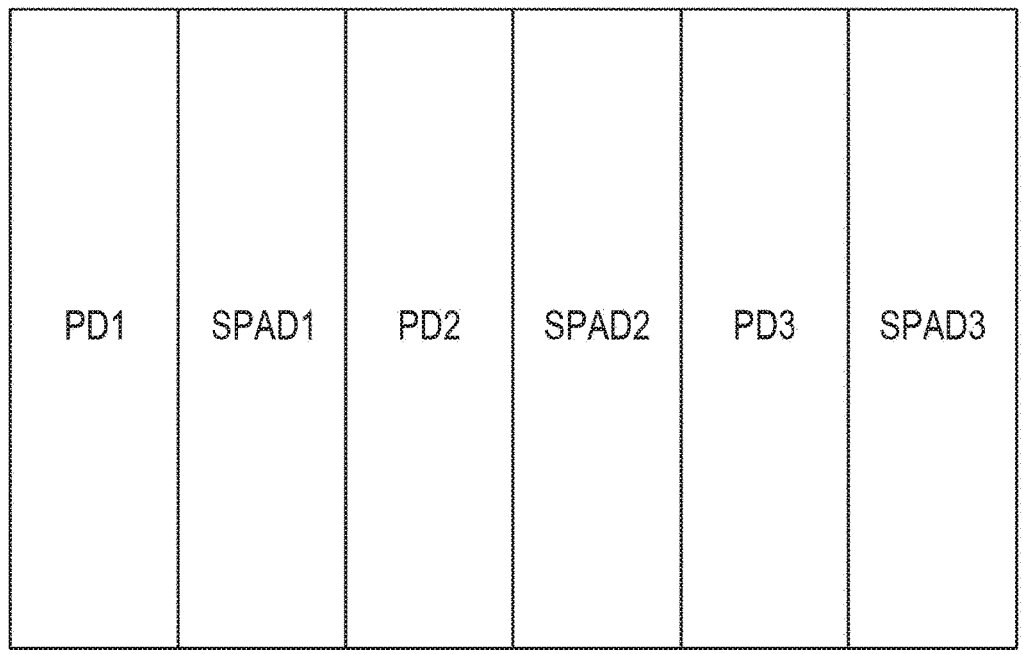

FIG. 4 shows that the surface of a semiconductor receiver module which has the single-photon avalanche diodes SPADA in a large field and the photodiodes PDC in a small side region. It is possible for the photodiodes to be located at different edge regions of the semiconductor module, but preferably as columns or as rows. Alternatively, it is shown in FIG. 5 that photodiodes or avalanche photodiodes and SPADs alternate columns by PD1 to PD3 and SPAD1 to SPAD3.

Figure 6:
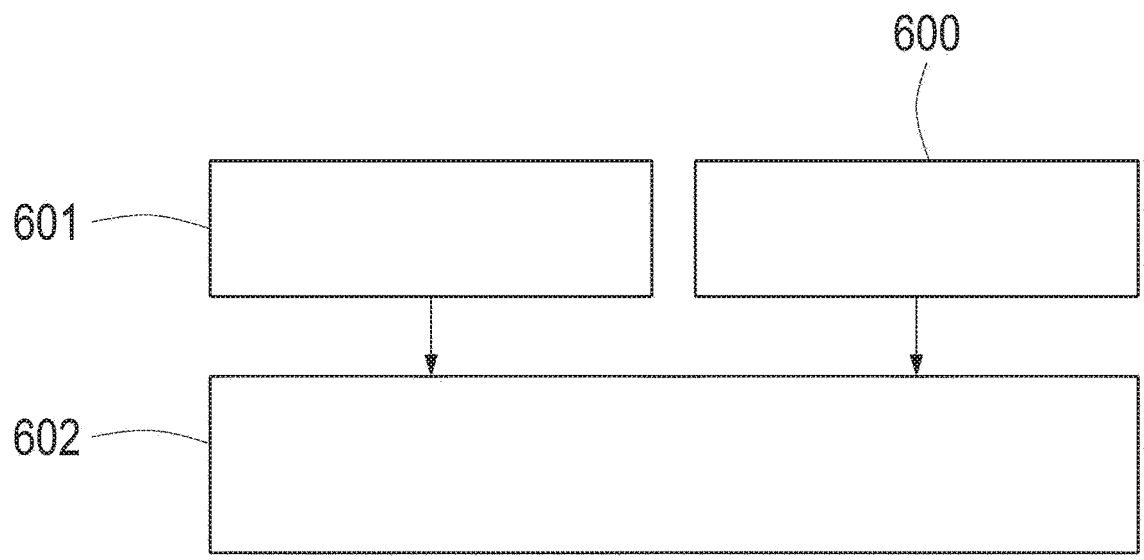

FIG. 6 shows a flow diagram of the method according to the invention. First electrical signals are generated with the first group of light-receiving elements in method step 600. At the same time, in method step 601, second electrical signals are generated by converting the second group of light-receiving elements. In method step 602, the arrangement according to the invention determines the distance of the arrangement from an object from the first and the second electrical signals.

The invention claimed is:

1. An arrangement for determining a distance of at least one object using light signals having:
a first group of light-receiving elements which convert the light signals into first electrical signals;
a second group of light-receiving elements which convert the light signals into second electrical signals;
a first signal processing which, using the first electrical signals, determines the distance by means of a time-correlated photon count as a function of a start signal (START) for an emission of the light signals;
a second signal processing which differs from the first signal processing and which, using the second electrical signals, determines the distance as a function of the start signal; and
the light-receiving elements of the first group having a higher sensitivity for a conversion of the light signals into electrical signals than the light-receiving elements of the second group,
wherein the second signal processing is a time-correlated sequential sampling,
wherein the time-correlated sequential sampling compares the second electrical signals with at least one ramp signal and feeds an output signal of this comparison to a first time-to-digital conversion and inverted to a second time-to-digital conversion,
wherein the first and the second time-to-digital conversion are started by the start signal and are connected on an output side to a histogram in order to fill this histogram with histogram values.

2. The arrangement according to claim 1, wherein the second electrical signals are analog.

3. The arrangement according to claim 1, wherein the first group has single-photon avalanche diodes or silicon photomultipliers as light-receiving elements and the second group has photodiodes or avalanche photodiodes as light-receiving elements.

4. The arrangement according to claim 3, wherein the photodiodes or the avalanche photodiodes are arranged on an edge of a semiconductor module on which the single-photon avalanche diodes are located.

5. The arrangement according to claim 3, wherein the photodiodes or the avalanche photodiodes are arranged between the single-photon avalanche diodes, preferably separated in columns or rows.

6. The arrangement according to claim 1, wherein the light-receiving elements of the first and the second group each have an associated receiving lens.

7. The arrangement according claim 1, wherein at least one ramp counter is provided for generating the at least one ramp signal, the ramp counter being increased in its count value with each start signal up to a predetermined final value, wherein the count value is output to at least one digital-analog converter which is connected on the output side to a comparator.

8. The arrangement according to claim 1, wherein a reciprocal of a rise time of the at least one ramp signal is an integer multiple of a frequency of pulses of the time-correlated photon count.

9. A method for determining a distance to at least one object using light signals having the following method steps:
the light signals are converted into first electrical signals by a first group of light-receiving elements;
the light signals are converted into second electrical signals by a second group of light-receiving elements;
the distance is determined using the first electrical signals by means of a time-correlated photon count as a function of a start signal for an emission of the light signals; and
the distance is determined using the second electrical signals by means of a further signal processing which is different from the time-correlated photon count as a function of a start signal,
wherein the light-receiving elements of the first group have a higher sensitivity for a conversion of the light signals into electrical signals than the light-receiving elements of the second group, wherein the second signal processing is a time-correlated sequential sampling,
wherein the time-correlated sequential sampling compares the second electrical signals with at least one ramp signal and feeds an output signal of this comparison to a first time-to-digital conversion and inverted to a second time-to-digital conversion,
wherein the first and the second time-to-digital conversion are started by the start signal and are connected on an output side to a histogram in order to fill this histogram with histogram values.

\* \* \* \* \*